US011611871B2

(12) United States Patent
Feng

(10) Patent No.: US 11,611,871 B2
(45) Date of Patent: Mar. 21, 2023

(54) RESOURCE CONFIGURATION METHOD AND APPARATUS

(71) Applicant: Huawei Technologies Co., Ltd., Shenzhen (CN)

(72) Inventor: Shulan Feng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 134 days.

(21) Appl. No.: 17/155,410

(22) Filed: Jan. 22, 2021

(65) Prior Publication Data

US 2021/0144547 A1    May 13, 2021

Related U.S. Application Data

(63) Continuation of application No. PCT/CN2019/097348, filed on Jul. 23, 2019.

(30) Foreign Application Priority Data

Jul. 23, 2018 (CN) .......................... 201810814537.X

(51) Int. Cl.
*H04W 8/24* (2009.01)
*H04W 72/04* (2023.01)

(52) U.S. Cl.
CPC ........... *H04W 8/24* (2013.01); *H04W 72/048* (2013.01)

(58) Field of Classification Search
CPC ........ H04W 72/048; H04W 8/24; H04W 8/22
See application file for complete search history.

(56) References Cited

U.S. PATENT DOCUMENTS

| 9,386,471 | B2 * | 7/2016 | Siomina | H04B 17/309 |
| 10,904,745 | B2 | 1/2021 | Lee et al. | |
| 2012/0084781 | A1 * | 4/2012 | Isaka | G06F 9/5038 |
| | | | | 718/100 |

(Continued)

FOREIGN PATENT DOCUMENTS

| CN | 1577305 A | 2/2005 |
| CN | 102368871 A | 3/2012 |

(Continued)

OTHER PUBLICATIONS

LG Electronics et al., "Discussion on CA operations for latency reduction", 3GPP TSG RAN WG1 Meeting #86bis, Oct. 10-14, 2016, R1-1609218, 2 pages, Lisbon, Portugal.

(Continued)

*Primary Examiner* — Congvan Tran
(74) *Attorney, Agent, or Firm* — Slater Matsil, LLP

(57) ABSTRACT

A resource configuration method and an apparatus are disclosed. A method includes: receiving capability information from a terminal device, where the capability information of the terminal device includes information about a first processing capability supported by the terminal device; and determining, based on the capability information of the terminal device, first processing capability configuration information of at least one frequency band used for the terminal device. The terminal device may report the capability information of the terminal device, so that the first processing capability configuration information of the at least one frequency band can be determined based on the capability information of the terminal device.

16 Claims, 4 Drawing Sheets

(56) References Cited

U.S. PATENT DOCUMENTS

| | | | |
|---|---|---|---|
| 2016/0135187 A1 | 5/2016 | Cui et al. | |
| 2018/0049272 A1* | 2/2018 | Bagheri | H04W 52/0209 |
| 2018/0324778 A1* | 11/2018 | Farajidana | H04L 5/0092 |
| 2019/0246389 A1 | 4/2019 | Tang | |
| 2019/0173633 A1* | 6/2019 | Kwak | H04W 72/1268 |
| 2019/0174492 A1* | 6/2019 | Gao | H04W 72/0446 |
| 2019/0174523 A1 | 6/2019 | Wang et al. | |
| 2020/0068504 A1* | 2/2020 | Yi | H04W 52/146 |
| 2021/0235258 A1* | 7/2021 | Takeda | H04L 1/1854 |

FOREIGN PATENT DOCUMENTS

| | | |
|---|---|---|
| CN | 102448176 A | 5/2012 |
| CN | 102594538 A | 7/2012 |
| CN | 102595604 A | 7/2012 |
| CN | 103491041 A | 1/2014 |
| CN | 104683080 A | 6/2015 |
| CN | 107734631 A | 2/2018 |
| WO | 2018010143 A1 | 1/2018 |
| WO | 2018010243 A1 | 1/2018 |
| WO | 2018062766 A1 | 4/2018 |
| WO | 2020008649 A1 | 1/2020 |

OTHER PUBLICATIONS

LG Electronics et al., "Discussion on configuration for shortened processing time in 1ms TTI" 3GPP TSG RAN WG1 Meeting #89, May 15-19, 2017, R1-1707533, 3 pages, Hangzhou, China.

Huawei, HiSilicon, "Remaining issues on HARQ", 3GPP TSG RAN WG1 Meeting 91, R1-1719401, Nov. 27-Dec. 1, 2017, 16 pages, Reno, USA.

Huawei, HiSilicon, "Remaining issues on scheduling and HARQ", 3GPP TSG RAN WG1 Meeting #93, R1-1805888, May 21-25, 2018, 14 pages, Busan, Korea.

3GPP TS 38.211 V1 5.2.0 (Jun. 2018), 3rd Generation Partnership Project; Technical Specification Group Radio Access Network; NR; Physical channels and modulation (Release 15), 96 pages.

3GPP TS 38.214 V15.2.0 (Jun. 2018), 3rd Generation Partnership Project; Technical Specification Group Radio Access Network; NR; Physical layer procedures for data (Release 15), 95 pages.

3GPP TS 38.306 V15.2.0 (Jun. 2018), 3rd Generation Partnership Project; Technical Specification Group Radio Access Network; NR; User Equipment (UE) radio access capabilities (Release 15), 28 pages.

3GPP TS 38.331 V15.2.1 (Jun. 2018), 3rd Generation Partnership Project; Technical Specification Group Radio Access Network; NR; Radio Resource Control (RRC) protocol specification (Release 15), 303 pages.

* cited by examiner

RESOURCE CONFIGURATION METHOD AND APPARATUS

CROSS-REFERENCE TO RELATED APPLICATIONS

This application is a continuation of International Application No. PCT/CN2019/097348, filed on Jul. 23, 2019, which claims priority to Chinese Patent Application No. 201810814537.X, filed on Jul. 23, 2018. The disclosures of the aforementioned applications are hereby incorporated by reference in their entireties.

TECHNICAL FIELD

The present invention relates to the field of mobile communications technologies, and in particular, to a resource configuration method and an apparatus.

BACKGROUND

In a new radio (NR) system, or in a 5th generation (5G) radio access system, a network device sends common information or dedicated information to a terminal device on a physical downlink shared channel (PDSCH), and indicates the terminal device to demodulate and receive the PDSCH by using downlink control information (DCI) carried on a control channel.

In an actual communications system, a terminal device has a corresponding processing capability, and needs to work based on an actual processing capability. However, currently, a network device cannot learn of the processing capability of the terminal device, and consequently cannot perform scheduling based on the capability of the terminal device when scheduling the terminal device. It is very likely that scheduling performed by the network device is beyond the actual capability of the terminal device. Consequently, the terminal device cannot work normally.

SUMMARY

Embodiments of this application provide a resource configuration method and an apparatus, to resolve a technical problem that a network device cannot perform scheduling based on an actual capability of a terminal device.

According to a first aspect, a first resource configuration method is provided. The method may be performed by a first communications apparatus, and the first communications apparatus is, for example, a network device such as a base station. The method includes: receiving capability information from a terminal device, where the capability information of the terminal device includes information about a first processing capability supported by the terminal device; and determining, based on the capability information of the terminal device, first processing capability configuration information of at least one frequency domain resource used for the terminal device. Optionally, the at least one frequency domain resource may be at least one frequency band.

In this embodiment of this application, the capability information of the terminal device may be received. In other words, the terminal device may report the capability information of the terminal device, so that the first processing capability configuration information of the at least one frequency band can be determined based on the capability information of the terminal device. In other words, scheduling can be performed based on the capability information of the terminal device, so that a scheduling result adapts to the capability information of the terminal device, thereby ensuring, as much as possible, that the terminal device can normally work within a capability range. In addition, in this embodiment of this application, the capability information of the terminal device includes the information about the first processing capability supported by the terminal device. In other words, the terminal device may report the information about the first processing capability, so that the terminal device can be scheduled to work with the first processing capability, thereby improving a processing capability of the terminal device.

In a possible design, the method further includes: sending indication information to the terminal device, where the indication information is used to indicate the first processing capability configuration information of the at least one frequency band.

After the first processing capability configuration information of the at least one frequency band used for the terminal device is determined, the terminal device may be notified of the first processing capability configuration information by using the indication information, so that the terminal device can be clear of scheduling performed by the network device, to work based on the scheduling performed by the network device.

According to a second aspect, a second resource configuration method is provided. The method may be performed by a second communications apparatus, and the second communications apparatus is, for example, a terminal device. The method includes: determining capability information of the terminal device, where the capability information of the terminal device includes information about a first processing capability supported by the terminal device; and sending the capability information of the terminal device to a network device.

In a possible design, the method further includes: receiving indication information from the network device, where the indication information is used to indicate first processing capability configuration information of at least one frequency band.

For technical effects brought by the second aspect or the design manner of the second aspect, refer to the technical effects brought by the different design manners of the first aspect. Details are not described herein again.

With reference to each possible design of either of the first aspect and the second aspect, in a possible design, the information about the first processing capability supported by the terminal device includes: a maximum number of frequency bands that can be configured for the terminal device in terms of the first processing capability, and/or a maximum number of frequency bands that can be activated for the terminal device in terms of the first processing capability.

Specifically, the information about the first processing capability supported by the terminal device may include: the maximum number of frequency bands that can be configured for the terminal device in terms of the first processing capability, or the maximum number of frequency bands that can be activated for the terminal device in terms of the first processing capability; or the maximum number of frequency bands that can be configured for the terminal device in terms of the first processing capability, and the maximum number of frequency bands that can be activated for the terminal device in terms of the first processing capability. The maximum number of frequency bands that can be configured for the terminal device in terms of the processing capability 2 may also be understood as a maximum number of frequency bands for which the processing capability 2 can be configured for the terminal device. Similarly, the maximum number of frequency bands that can be activated for the terminal device in terms of the processing capability 2 may also be understood as a maximum number of frequency bands for which the processing capability 2 can be activated for the terminal device. In this embodiment of this application, two pieces of information, namely, the maximum number of frequency bands that can be configured and the maximum number of frequency bands that can be activated, may be provided, so that more information can be provided for scheduling performed by the network device, and resource waste of the terminal device can be reduced as much as possible.

With reference to each possible design of either of the first aspect and the second aspect, in a possible design, the first processing capability configuration information of the at least one frequency band includes: a number of frequency bands configured for the terminal device, and/or a number of frequency bands activated for the terminal device.

To be specific, the first processing capability configuration information of the at least one frequency band may include the number of frequency bands configured for the terminal device or the number of frequency bands activated for the terminal device, or the number of frequency bands configured for the terminal device and the number of frequency bands activated for the terminal device. According to the technical solution in this embodiment of this application, a frequency band such as a carrier or a BWP for which the processing capability 2 can be configured (or activated) can be relatively fixed, so that complexity caused by frequent resource adjustment of the terminal device is avoided as much as possible, and resource waste caused by reservation of excessive processing resources by the terminal device is avoided. In addition, after the terminal device learns of the corresponding number, if the first processing capability configuration information includes the number of frequency bands configured for the terminal device, the terminal device may flexibly select a configured frequency band based on the number. If the first processing capability configuration information includes the number of frequency bands activated for the terminal device, the terminal device may flexibly select an activated frequency band based on the number. For the terminal device, this is flexible to some extent.

With reference to each possible design of either of the first aspect and the second aspect, in a possible design, the first processing capability configuration information of the at least one frequency band includes: configuring the first processing capability for the at least one frequency band, and/or activating the first processing capability for the at least one frequency band.

In other words, the first processing capability configuration information of the at least one frequency band may include information about configuring the processing capability 2 for the at least one frequency band or information about activating the processing capability 2 for the at least one frequency band, or information about configuring the processing capability 2 for the at least one frequency band and information about activating the processing capability 2 for the at least one frequency band. Configuring the processing capability 2 for the at least one frequency band may be understood as configuring the processing capability 2 for all or some of the at least one frequency band. Similarly, activating the processing capability 2 for the at least one frequency band may be understood as activating the processing capability 2 for all or some of the at least one frequency band. In this manner, the network device does not configure the number, but directly indicates frequency bands for which the processing capability 2 is configured and/or frequency bands for which the processing capability 2 is activated. Therefore, the terminal device does not need to select, based on the number, specific frequency bands for which the processing capability 2 is configured and/or specific frequency bands for which the processing capability 2 is activated, thereby reducing workload of the terminal device, and enabling a consistent understanding between the terminal device and the network device.

With reference to each possible design of either of the first aspect and the second aspect, in a possible design, the number of frequency bands configured for the terminal device is less than or equal to the maximum number of frequency bands that can be configured for the terminal device; and/or the number of frequency bands activated for the terminal device is less than or equal to the maximum number of frequency bands that can be activated for the terminal device.

To be specific, the number of frequency bands configured for the terminal device may be less than or equal to the maximum number of frequency bands that can be configured for the terminal device, or the number of frequency bands activated for the terminal device is less than or equal to the maximum number of frequency bands that can be activated for the terminal device; or the number of frequency bands configured for the terminal device may be less than or equal to the maximum number of frequency bands that can be configured for the terminal device, and the number of frequency bands activated for the terminal device is less than or equal to the maximum number of frequency bands that can be activated for the terminal device. Because the network device has obtained the capability information of the terminal device, when determining the configuration information of the at least one frequency band, the network device may determine the configuration information of the at least one frequency band based on the capability information of the terminal device, so that scheduling on the terminal device can adapt to a capability of the terminal device.

With reference to each possible design of either of the first aspect and the second aspect, in a possible design, the first processing capability corresponds to a processing time of a data channel, and the data channel is an uplink data channel or a downlink data channel.

The first processing capability is related to the processing time of the data channel. If the processing time of the data channel is different, the first processing capability may also be different.

With reference to each possible design of either of the first aspect and the second aspect, in a possible design, a processing time of the downlink data channel is obtained based on a decoding time $N_1$ of the downlink data channel, and a processing time of the uplink data channel is obtained based on an uplink data preparation time $N_2$.

The processing time of the downlink data channel may be obtained based on $N_1$, and the processing time of the uplink data channel may be obtained based on $N_2$. The manner is relatively simple.

With reference to each possible design of either of the first aspect and the second aspect, in a possible design, a processing time of the downlink data channel is obtained based on a decoding time $N_1$ of the downlink data channel and a, a is a preconfigured or predefined parameter, and a is greater than zero; and a processing time of the uplink data channel is obtained based on an uplink data preparation time $N_2$ and b, b is a preconfigured or predefined parameter, and b is greater than zero.

In this manner, if a case in which there are two or more frequency bands is considered, the channel processing time may increase. If the processing time of the downlink data channel is obtained only based on $N_1$, the obtained processing time of the downlink data channel may be less than an actual requirement. Similarly, if the processing time of the uplink data channel is obtained only based on $N_2$, the obtained processing time of the uplink data channel may be less than an actual requirement. Therefore, corresponding processing may be considered to be performed on the basis of original $N_1$ and/or $N_2$. In view of this, the processing time of the downlink data channel may be obtained based on $N_1$ and a, and the processing time of the uplink data channel may be obtained based on $N_2$ and b. Both a and b may be understood as additional processing time introduced for processing the two or more frequency bands. In this manner, a case in which the processing time of the data channel may increase due to a relatively large number of frequency bands is relatively fully considered, so that the determined processing time of the uplink data channel and the determined processing time of the downlink data channel better meet an actual requirement.

With reference to each possible design of either of the first aspect and the second aspect, in a possible design, the frequency band is a carrier or a BWP.

In this embodiment of this application, the frequency band may be a carrier or a BWP, or the frequency band may be a transport block, a data stream, an antenna layer, or the like. This is not specifically limited.

According to a third aspect, a first communications apparatus is provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, a specific structure of the communications apparatus may include a processing module and a transceiver module. The processing module and the transceiver module may perform corresponding functions in the method according to any one of the first aspect or the possible implementations of the first aspect.

According to a fourth aspect, a second communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processing module and a transceiver module. The processing module and the transceiver module may perform corresponding functions in the method according to any one of the second aspect or the possible implementations of the second aspect.

According to a fifth aspect, a third communications apparatus is provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, a specific structure of the communications apparatus may include a processor and a transceiver. The processor and the transceiver may perform corresponding functions in the method according to any one of the first aspect or the possible implementations of the first aspect.

According to a sixth aspect, a fourth communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a processor and a transceiver. The processor and the transceiver may perform corresponding functions in the method according to any one of the second aspect or the possible implementations of the second aspect.

According to a seventh aspect, a fifth communications apparatus is provided. The communications apparatus may be the network device in the foregoing method designs, or may be a chip disposed in the network device. The communications apparatus includes: a memory, configured to store computer-executable program code; and a processor. The processor is coupled to the memory. The program code stored in the memory includes an instruction. When the processor executes the instruction, the fifth communications apparatus is enabled to perform the method according to any one of the first aspect or the possible implementations of the first aspect.

According to an eighth aspect, a sixth communications apparatus is provided. The communications apparatus may be the terminal device in the foregoing method designs, or may be a chip disposed in the terminal device. The communications apparatus includes: a memory, configured to store computer-executable program code; and a processor. The processor is coupled to the memory. The program code stored in the memory includes an instruction. When the processor executes the instruction, the sixth communications apparatus is enabled to perform the method according to any one of the second aspect or the possible implementations of the second aspect.

According to a ninth aspect, a first communications system is provided. The communications system may include the first communications apparatus according to the third aspect and the second communications apparatus according to the fourth aspect.

According to a tenth aspect, a second communications system is provided. The communications system may include the third communications apparatus according to the fifth aspect and the fourth communications apparatus according to the sixth aspect.

According to an eleventh aspect, a third communications system is provided. The communications system may include the fifth communications apparatus according to the seventh aspect and the sixth communications apparatus according to the eighth aspect.

According to a twelfth aspect, a computer storage medium is provided. The computer-readable storage medium stores an instruction. When the instruction is run on a computer, the computer is enabled to perform the method in any one of the first aspect or the possible designs of the first aspect.

According to a thirteenth aspect, a computer storage medium is provided. The computer-readable storage medium stores an instruction. When the instruction is run on a computer, the computer is enabled to perform the method in any one of the second aspect or the possible designs of the second aspect.

According to a fourteenth aspect, a computer program product including an instruction is provided. The computer program product stores the instruction. When the computer program product runs on a computer, the computer is enabled to perform the method according to any one of the first aspect or the possible designs of the first aspect.

According to a fifteenth aspect, a computer program product including an instruction is provided. The computer program product stores the instruction. When the computer program product runs on a computer, the computer is enabled to perform the method according to any one of the second aspect or the possible designs of the second aspect.

In the embodiments of this application, the terminal device may report the capability information of the terminal device, so that scheduling can be performed based on the capability information of the terminal device. In this way, a scheduling result adapts to the capability information of the terminal device, and it is ensured as much as possible that the terminal device can normally work within a capability range.

DETAILED DESCRIPTION OF ILLUSTRATIVE EMBODIMENTS

Figure 1:
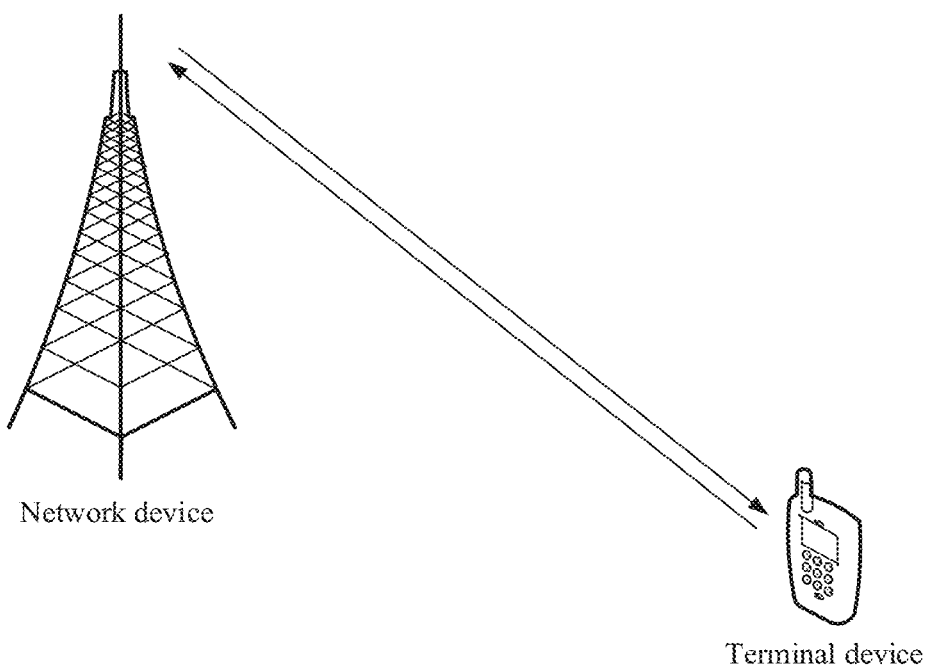
FIG. 1 is a schematic diagram of an application scenario according to an embodiment of this application.

To make the objectives, technical solutions and advantages of embodiments of this application clearer, the following further describes the embodiments of this application in detail with reference to the accompanying drawings.

The following explains and describes some terms in the embodiments of this application, to facilitate understanding of a person skilled in the art.

(1) A terminal device is a device that provides a user with voice and/or data connectivity, for example, a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal device (remote terminal), an access terminal device (access terminal), a user terminal device (user terminal), a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, an intelligent wearable device, or the like. For example, the terminal device may be a device, for example, a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn on a body or integrated into clothes or an accessory of a user. The wearable device is not merely a hardware device, but is used to implement a powerful function through software support, a data exchange, and cloud interaction. In a broad sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application function and needs to be used with another device, for example, a smartphone. For example, the wearable intelligent device is a smart wristband, a smart helmet, or smart jewelry for physical sign monitoring.

(2) A network device, for example, including a base station (for example, an access point), may be a device that is in an access network and that communicates with a wireless terminal device over an air interface in one or more cells. The network device may be configured to: mutually convert a received over-the-air frame and an internet protocol (IP) packet, and serve as a router between the terminal device and a remaining portion of the access network. The remaining portion of the access network may include an IP network. The network device may further coordinate attribute management of the air interface. For example, the network device may include an evolved NodeB (NodeB, or eNB, or e-NodeB, evolutional Node B) in a long term evolution (LTE) system or an LTE-advanced system (LTE-A)), or may include a next generation NodeB (gNB) in a 5th generation mobile communications technology (5G) new radio (NR) system, or may include a centralized unit (CU) and a distributed unit (DU) in a cloud access network (CloudRAN) system. This is not limited in the embodiments of this application.

The network device in this specification is not limited to a serving cell or a serving base station of the terminal device, and may alternatively be any network device that can store capability information of the terminal device, for example, a mobility management entity (MME).

(3) A capability of the terminal device may be reflected by first information of the terminal device. The first information is referred to as, for example, capability information or configuration information, or may have another name, provided that the first information is used to indicate the capability of the terminal device. The name is not limited in the embodiments of this application. In the following descriptions, for example, the capability of the terminal device is referred to as capability information. For example, if the terminal device is implemented by UE, the capability information of the terminal device may also be referred to as capability information of the UE.

For example, the capability information of the terminal device may include configuration information of a channel, and may further include other information related to the capability of the terminal device.

(4) Multi-RAT dual connectivity Multi-access technology dual connectivity (MR-DC): With development of a fifth-generation mobile communications technology (5G), in deployment of an operator, it may be configured that a base station working in an evolved universal mobile telecommunications system terrestrial radio access (E-UTRA) system and a base station working in a 5G NR system communicate with a terminal device together. In other words, the terminal device may be connected to both the base station (referred to as an E-UTRA base station for short below) working in the E-UTRA system and the base station (referred to as an NR base station for short below) working in the NR system. In this way, data can be transmitted by using a frequency of the E-UTRA system, and data can also be transmitted by using a frequency of the NR system, to improve a throughput of the terminal device. Such a scenario in which the terminal device is connected to both the base stations of two different access technologies may be referred to as MR-DC.

(5) The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, one, two, or more. For example, including at least one means including one, two, or more, and does not limit what are included. For example, including at least one of A, B, and C may represent the following cases: A is included, B is included, C is included, A and B are included, A and C are included, B and C are included, or A and B and C are included. "At least two" may be understood as two or more. Similarly, understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

In addition, unless otherwise specified, ordinal numbers such as "first" and "second" mentioned in the embodiments of this application are used to distinguish between a plurality of objects, and are not used to limit a sequence, a time sequence, a priority, or importance of the plurality of objects. For example, a first capability message and a second capability message are merely intended to distinguish between different messages, and do not indicate that the two capability messages are different in content, priority, importance, or the like.

The foregoing describes some concepts in the embodiments of this application. The following describes technical features in the embodiments of this application.

In a 5G system, a terminal device generally performs two processing processes: a PDSCH processing process and a physical uplink shared channel (PUSCH) processing process. The PDSCH processing process includes: The terminal device receives, demodulates, and decodes a physical downlink control channel (PDCCH). The PDCCH includes scheduling information for a PDSCH. The terminal device parses DCI included in the PDCCH, receives the PDSCH based on the scheduling information included in the DCI, then demodulates and decodes the PDSCH, and generates, based on a decoding result of the PDSCH, hybrid automatic repeat request (HARQ) acknowledgment (ACK) information, including an acknowledgment (ACK) or a negative acknowledgment (NACK). The ACK indicates that received data is correctly decoded, and the NACK indicates that the received data is incorrectly decoded. Duration from a time point at which the terminal device receives the last symbol of the PDSCH to an earliest time point at which the terminal device can send the HARQ-ACK information is defined to be a PDSCH processing time of the terminal device. For example, $T_{proc,1}$ is used to represent the duration. $T_{proc,1}$ is obtained based on $N_1$. Specifically, $T_{proc,1}=((N_1+d_{1,1}+d_{1,2})(2048+144)\cdot\kappa 2^{-\mu})\cdot T_c$. If the HARQ-ACK carries $d_{1,1}=0$ on a physical uplink control channel (PUCCH), and the HARQ-ACK carries $d_{1,1=1}$ on a PUSCH, if a PDSCH demodulation reference signal mapping type is A, the last symbol of the PDSCH is a symbol i, and i<7, $d_{1,2}=7-i$. If the PDSCH demodulation reference signal mapping type is B, a processing capability is a processing capability 1, and a PDSCH symbol length is 4, $d_{1,2}=3$. If the PDSCH symbol length is 2, $d_{1,2}=3+d$. d is a number of overlapping symbols between PDSCH and corresponding PDCCH. If the PDSCH demodulation reference signal mapping type is B, and the processing capability is a processing capability 2, $d_{1,2}$ is a number of overlapping symbols between PDSCH and corresponding PDCCH. $\kappa=T_s/T_c=64$, $T_c=1/(\Delta f_{max}\cdot N_f)$ is a basic time unit for NR, and may be considered as a smallest sampling time in an NR system, $\Delta f_{max}=480\cdot 10^3$ Hz, and $N_f=4096$. $T_s=1/(\Delta f_{ref}\cdot N_{f,ref})$ is a basic time unit for LTE, and may be considered as a smallest sampling time in an LTE system, where $\Delta f_{ref}=15\cdot 10^3$ Hz, and $N_{f,ref}=2048$. $N_1$ is referred to as, for example, a decoding time of a downlink data channel, and is specifically used to calculate a number of OFDM symbols of $T_{proc,1}$. Different values may be selected based on subcarrier spacings, different values may be selected based on demodulation reference signal mapping manner, or different values may be selected based on processing capabilities of the terminal device. For example, the terminal device may have two processing capabilities: respectively the processing capability 1 and the processing capability 2. $N_1$ in cases of the two processing capabilities has different values based on different processing capabilities. For another example, when different subcarrier spacings are used in uplink and downlink, a value of $N_1$ uses μ that makes $T_{proc,1}$ the largest and that is in (μPDCCH, μPDSCH, μUL). μPDCCH is a subcarrier spacing of the PDCCH that schedules the PDSCH, μPDSCH is a subcarrier spacing of the PDSCH, and UL is a subcarrier spacing of a corresponding HARQ-ACK. When μ=1, for a terminal device that supports the processing capability 2 only in a limited scheduling scenario, if a number of scheduled RBs (resource block) exceeds 136, a processing capability of the terminal device may go back to the processing capability 1. The PUSCH processing process of the terminal device includes: The terminal device receives, demodulates, and decodes a PDCCH. The PDCCH includes scheduling information for a PUSCH. The terminal device parses DCI included in the PDCCH, generates an uplink data packet based on the scheduling information included in the DCI, and then sends the uplink data packet on an uplink resource after performing processing such as encoding and modulation on the uplink data packet. Duration from a time point at which the terminal device receives the last symbol of a PDCCH to an earliest time point at which the terminal device can send a PUSCH (including a demodulation reference signal (DMRS) of the PUSCH) is defined to be a PUSCH processing time of the terminal device, and is represented by, for example, $T_{proc,2}$. $T_{proc,2}$ is obtained based on $N_2$, and $T_{proc,2}=\max(((N_2+d_{2,1}+d_{2,2})(2048+144)\cdot\kappa 2^{-\mu})\cdot T_c, d_{2,3})$. If a first PUSCH includes a DM-RS, $d_{2,1}=0$; otherwise, $d_{2,1}=1$. If the HARQ-ACK is multiplexed with the PUSCH, $d_{2,2}=1$; otherwise, $d_{2,2}=0$. If the scheduled DCI triggers BWP switching, $d_{2,3}$ is equal to a BWP switching time; otherwise, $d_{2,3}=0$. $N_2$ is referred to as, for example, a preparation time of an uplink data channel, and is specifically a number of OFDM symbols that are used to calculate $T_{proc,2}$. Different values may be selected based on subcarrier spacings, different values may be selected based on demodulation reference signal mapping manners, or different values may be selected based on processing capabilities of the terminal device. For example, the terminal device may have two processing capabilities: respectively the processing capability 1 and the processing capability 2. $N_2$ in cases of the two processing capabilities has different values based on different processing capabilities. For another example, when different subcarrier spacings are used in uplink and downlink, a value of $N_1$ uses that makes $T_{proc,2}$ the largest and that is in (μDL, μUL). DL is a subcarrier spacing of the PDCCH that schedules the DCI of the PUSCH, and UL is a subcarrier spacing of the corresponding PUSCH.

For the terminal device, there may be only one processing capability, which is referred to as, for example, the processing capability 1 or a second processing capability, or may have another name. Alternatively, it is currently proposed that the terminal device may also have a plurality of processing capabilities. For example, the terminal device may further support another processing capability, which is referred to as, for example, the processing capability 2 or a first processing capability, or may have another name. Values of $N_1$ and $N_2$ are defined for each processing capability. A value of $N_1$ of the terminal device with the processing capability 1 is greater than a value of $N_1$ of the terminal device with the processing capability 2. A value of $N_2$ of the terminal device with the processing capability 1 is greater than a value of $N_2$ of the terminal device with the processing capability 2.

Referring to the following Table 1 to Table 4, corresponding values that are defined in a 5G system and that are of $N_1$ and $N_2$ of the terminal device with the processing capability 1 and the processing capability 2 in various cases are provided. μ is used to represent a subcarrier spacing of the PDSCH, the PUSCH, or the PDCCH. For the PDSCH, that corresponds to $N_1$ that makes an absolute time of the processing time $T_{proc,1}$ the largest and that is in (μPDCCH, μPDSCH, μUL) is used as final. μPDCCH represents a subcarrier spacing of the PDCCH that is used to schedule the PDSCH, μPDSCH represents a subcarrier spacing of the PDSCH, and UL represents a subcarrier spacing of a corresponding HARQ-ACK. For the PUSCH, that corresponds to $N_2$ that makes an absolute time of the processing time $T_{proc,2}$ the largest and that is in (μDL, μUL) is used as final μ. μDL represents a subcarrier spacing of the PDCCH that is used to schedule the DCI of the PUSCH, and μUL represents a subcarrier spacing of the corresponding PUSCH.

TABLE 1

Values of $N_1$ when the terminal device has the processing capability 1

PDSCH processing time $N_1$ [symbols]

| μ | If the DMRS mapping type A (dmrs-DownlinkForPDSCH-MappingTypeA) of the PDSCH and a DMRS mapping type B (dmrs-DownlinkForPDSCH-MappingTypeB) of the PDSCH are both configured with only front-loaded pilots, that is, no additional DMRS position (dmrs-AdditionalPosition) = pos0 | If either dmrs-DownlinkForPDSCH-MappingTypeA or dmrs-DownlinkForPDSCH-MappingTypeB has an additional DMRS, that is, an additional DMRS position dmrs-AdditionalPosition ≠ pos0 |
|---|---|---|
| 0 | 8 | 13 |
| 1 | 10 | 13 |
| 2 | 17 | 20 |
| 3 | 20 | 24 |

TABLE 2

Values of $N_1$ when the terminal device has the processing capability 2

PDSCH processing time $N_1$ [symbols]

| μ | If dmrs-AdditionalPosition = pos0 is configured for both dmrs-DownlinkForPDSCH-MappingTypeA and dmrs-DownlinkForPDSCH-MappingTypeB | If in either of dmrs-DownlinkForPDSCH-MappingTypeA and dmrs-DownlinkForPDSCH-MappingTypeB, dmrs-AdditionalPosition ≠ pos0 |
|---|---|---|
| 0 | 3 | 13 |
| 1 | 4.5 | 13 |
| 2 | 9 | 20 |

TABLE 2-continued

Values of $N_1$ when the terminal device has the processing capability 2

PDSCH processing time $N_1$ [symbols]

| μ | If dmrs-AdditionalPosition = pos0 is configured for both dmrs-DownlinkForPDSCH-MappingTypeA and dmrs-DownlinkForPDSCH-MappingTypeB | If in either of dmrs-DownlinkForPDSCH-MappingTypeA and dmrs-DownlinkForPDSCH-MappingTypeB, dmrs-AdditionalPosition ≠ pos0 |
|---|---|---|
| | (for a frequency domain range 1 (for frequency range 1)) | |

TABLE 3

Values of $N_2$ when the terminal device has the processing capability 1

| μ | PUSCH processing time $N_2$ [symbols] |
|---|---|
| 0 | 10 |
| 1 | 12 |
| 2 | 23 |
| 3 | 36 |

TABLE 4

Values of $N_2$ when the terminal device has the processing capability 2

| μ | PUSCH processing time $N_2$ [symbols] |
|---|---|
| 0 | 5 |
| 1 | 5.5 |
| 2 | 11 for frequency range 1 |

It can be learned from Table 1 to Table 4 that values of $N_1$ and $N_2$ are related to at least one of the subcarrier spacing, the demodulation reference signal mapping manner, and the processing capability of the terminal device. For example, the values of $N_1$ and $N_2$ may be different when subcarrier spacings are different, the values of $N_1$ and $N_2$ may be different in different demodulation reference signal mapping manners, or the values of $N_1$ and $N_2$ may be different in cases of different processing capabilities of the terminal device. In addition, it can be learned from Table 1 to Table 4 that $N_1$ of the terminal device with the processing capability 2 is less than $N_1$ of the terminal device with the processing capability 1, and $N_2$ of the terminal device with the processing capability 2 is less than $N_2$ of the terminal device with the processing capability 1. In other words, the processing capability 2 is a processing capability higher than the processing capability 1. Therefore, to implement faster processing, that is, to enable the terminal device to implement the processing capability 2, all resources of the terminal device may need to be centralized for processing. For this, a possible method is to reduce a size of a time-frequency resource that needs to be processed by the terminal device. For example, it is specified that the terminal device can reach the processing capability 2 only when a scheduled frequency band is less than or equal to 136 resource blocks (RB). If the scheduled frequency band is greater than 136 RBs, the processing capability of the terminal device goes back to the processing capability 1.

However, a current base station cannot learn in advance whether the terminal device supports the processing capability 2. Therefore, during scheduling of the terminal device, if only the terminal device is scheduled to implement the processing capability 1, for the terminal device that can implement the processing capability 2, a capability is wasted. However, if the base station schedules the terminal device to implement the processing capability 2, for the terminal device that cannot implement the processing capability 2, scheduling performed by the base station exceeds a capability range of such a terminal device. Consequently, the terminal device cannot normally work. Particularly, during carrier aggregation (CA), the current base station cannot learn in advance whether the terminal device supports the processing capability 2 during carrier scheduling in CA. For example, the base station does not learn whether the terminal device supports the processing capability 2 only during single-carrier scheduling or during multi-carrier scheduling. If the terminal device supports the processing capability 2 only during single-carrier scheduling, but does not support the processing capability 2 during multi-carrier scheduling, and if the base station schedules the processing capability 2 for all carriers when scheduling the terminal device, scheduling performed by the base station exceeds a capability range of such a terminal device. Consequently, the terminal device cannot normally work. Alternatively, if the terminal device has two carriers that support the processing capability 2, if the base station schedules the processing capability 2 for all four carriers when scheduling the terminal device, scheduling performed by the base station exceeds a capability range of such a terminal device. Consequently, the terminal device cannot normally work. Alternatively, if the terminal device has four carriers that support the processing capability 2, if the base station schedules the processing capability 2 for only one carrier when scheduling the terminal device, for the terminal device that can implement four carriers supporting the processing capability 2, a capability is wasted.

In view of this, an embodiment of this application provides a resource configuration method. In this embodiment of this application, the terminal device may report the capability information of the terminal device, and scheduling can be performed based on the capability information of the terminal device, so that a scheduling result adapts to the capability information of the terminal device, thereby ensuring, as much as possible, that the terminal device can normally work within a capability range.

The technical solution provided in this embodiment of this application may be used in a 5G system, or may be used in a future communications system, or may be used in another similar communications system.

FIG. 1 shows an application scenario of this embodiment of this application. FIG. 1 includes a network device and a terminal device. The terminal device can communicate with the network device over an air interface. Certainly, a number of terminal devices in FIG. 1 is merely an example. In actual application, the network device may provide services for a plurality of terminal devices, and all or some of the plurality of terminal devices may send capability information to the network device by using the method according to this embodiment of this application. Transmission between the network device and the terminal device may be performed by using a radio wave, or may be performed by using visible light, a laser, infrared, a photon, a power line, an optical fiber, a coaxial cable, a copper twisted pair, or the like.

The network device in FIG. 1 is, for example, an access network (AN) device, for example, a base station. The access network device corresponds to different devices in different systems. For example, the access network device may correspond to an eNB in a 4th generation mobile communications technology (4G) system, and correspond to an access network device, for example, a gNB, in 5G in a 5G system. Similarly, the access network device may correspond to another device in another communications system.

The following describes, with reference to the accompanying drawings, the technical solution provided in an embodiment of this application.

Figure 2:
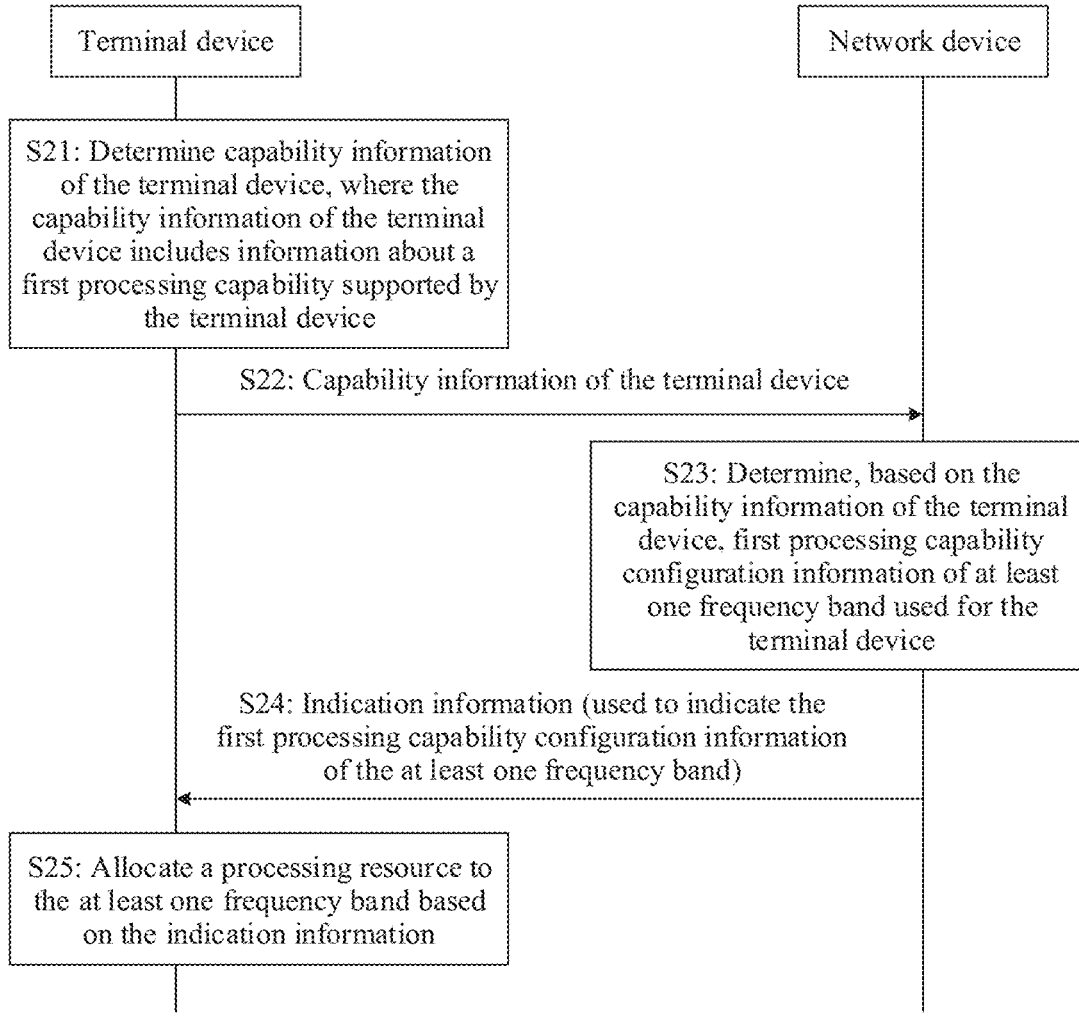
FIG. 2 is a flowchart of a resource configuration method according to an embodiment of this application.

This embodiment of this application provides a resource configuration method. FIG. 2 is a flowchart of the method. The method may be used in the scenario shown in FIG. 1. In the following description process, an example in which the method according to this embodiment of this application is used in the application scenario shown in FIG. 1 is used. In addition, the method may be performed by two communications apparatuses. The two communications apparatuses are, for example, a first communications apparatus and a second communications apparatus. The first communications apparatus may be a network device or a communications apparatus that can support the network device in implementing a function required in the method, or the first communications apparatus may be a terminal device or a communications apparatus that can support the terminal device in implementing a function required in the method. Certainly, the first communications apparatus may be another communications apparatus, for example, a chip system. Similarly, for the second communications apparatus, the second communications apparatus may be a network device or a communications apparatus that can support the network device in implementing a function required in the method, or the second communications apparatus may be a terminal device or a communications apparatus that can support the terminal device in implementing a function required in the method. Certainly, the second communications apparatus may be another communications apparatus, for example, a chip system. In addition, implementations of both the first communications apparatus and the second communications apparatus are not limited. For example, the first communications apparatus may be a network device, and the second communications apparatus is a terminal device, or both the first communications apparatus and the second communications apparatus are network devices, or both the first communications apparatus and the second communications apparatus are terminal devices, or the first communications apparatus is a network device, and the second communications apparatus is a communications apparatus that can support the terminal device in implementing a function required in the method, or the like. For example, the network device is a base station.

For ease of description, the following uses an example in which the method is performed by a network device and a terminal device, to be specific, an example in which the first communications apparatus is a network device and the second communications apparatus is a terminal device.

S21: The terminal device determines capability information of the terminal device, where the capability information of the terminal device includes information about a first processing capability supported by the terminal device. In the following, for ease of distinguishing, the first processing capability is referred to as a processing capability 2.

For example, the terminal device may determine the capability information of the terminal device based on a factor such as a design specification of the terminal device. Alternatively, the capability information of the terminal device may be preconfigured in the terminal device, and the terminal device may directly obtain the capability information of the terminal device, or the terminal device may obtain the capability information of the terminal device in another manner. A specific obtaining method is not limited.

In an implementation, the capability information of the terminal device includes information about the first processing capability supported by the terminal device in P frequency bands, and P is an integer greater than or equal to 1. Therefore, in this specification, the P frequency bands are also referred to as at least one frequency band. The frequency band is, for example, a carrier (carrier bandwidth), and the information about the first processing capability is information about the first processing capability on P carriers, or the frequency band is a bandwidth part (BWP), and the information about the first processing capability is information about the first processing capability in P BWPs.

Certainly, the capability information of the terminal device may further include information about a second processing capability supported by the terminal device. Similarly, for ease of differentiation, the second processing capability is referred to as a processing capability 1 below. It may be understood that the capability information of the terminal device includes information about the processing capability 1 and/or information about the processing capability 2 that are/is supported by the terminal device. To be specific, the capability information of the terminal device includes the information about the processing capability 1 supported by the terminal device, or the information about the processing capability 2 supported by the terminal device, or the information about the processing capability 1 supported by the terminal device and the information about the processing capability 2 supported by the terminal device. Because the processing capability 1 has a relatively low requirement on the terminal device, it is generally agreed on that all terminal devices support the processing capability 1. Therefore, the terminal device generally does not send the information about the processing capability 1 to the network device. However, the network device does not know whether the terminal device can support the processing capability 2. Therefore, this embodiment of this application mainly describes a case in which the terminal device may send the information about the processing capability 2 of the terminal device to the network device. Further, the information about the first processing capability supported by the terminal device may be that the terminal device has a same capability or different capabilities in different frequency bands or frequency band combinations. For example, a processing capability in a frequency band range 1 may be the same as or different from a processing capability in a frequency band range 2. The processing capability in the frequency band range 1 is the processing capability 2, and the processing capability in the frequency band range 2 is the processing capability 1.

S22: The terminal device sends the capability information of the terminal device to the network device, and the network device receives the capability information of the terminal device from the terminal device, where the capability information of the terminal device includes the information about the processing capability 2 supported by the terminal device.

As described in S21, the capability information of the terminal device may include the information about the processing capability 1 and/or the information about the processing capability 2 that are/is supported by the terminal device. In this case, in S22, the terminal device sends, to the network device, the capability information determined by the terminal device. If the terminal device does not support the processing capability 2, the capability information of the terminal device does not need to be sent to the network device. In other words, the capability information that is of the terminal device and that is sent by the terminal device to the network device includes information about whether the terminal device supports the processing capability 2, to be specific, the information about the processing capability 1 and/or the information about the processing capability 2 that are/is supported by the terminal device.

For example, if it is determined by default, for example, in a manner predefined in a protocol, or it is preconfigured in the network device, that the terminal device supports the processing capability 1, the network device may determine that the terminal device supports the processing capability 1, and the terminal device does not need to send the processing capability 1 to the network device. In this case, if the terminal device supports the processing capability 2, S22 may be performed, to be specific, the capability information of the terminal device is sent to the network device, and the capability information includes the information about the processing capability 2 supported by the terminal device. If the terminal device does not support the processing capability 2, S22 does not need to be performed, to be specific, the capability information of the terminal device does not need to be sent to the network device. Alternatively, if it is not determined by default that the terminal device supports the processing capability 1, that is, the network device cannot learn in advance whether the terminal device supports the processing capability 1, the terminal device may perform S22, to be specific, send the capability information of the terminal device to the network device. In this case, the sent capability information of the terminal device may include the processing capability 1 of the terminal device. If the terminal device supports the processing capability 2, the capability information may further include the processing capability 2 of the terminal device. In other words, the capability information may include the processing capability 1 and the processing capability 2 of the terminal device. Certainly, if the terminal device does not support the processing capability 2, the capability information includes only the processing capability 1 of the terminal device. Alternatively, if it is not determined by default that the terminal device supports the processing capability 1, the terminal device may perform S22, to be specific, send the capability information of the terminal device to the network device. In this case, the sent capability information of the terminal device may include the processing capability 1 of the terminal device, and the processing capability 2 of the terminal device may not be considered. Alternatively, if it is not determined by default that the terminal device supports the processing capability 1, if the terminal device supports the processing capability 2, the terminal device may perform S22, to be specific, send the capability information of the terminal device to the network device. In this case, the sent capability information of the terminal device may include the processing capability 2 of the terminal device. If the terminal device does not support the processing capability 2, S22 may not be performed, to be specific, the capability information of the terminal device does not need to be sent to the network device. In other words, the processing capability 1 of the terminal device may not be sent to the network device.

In this embodiment of this application, an example in which the capability information that is of the terminal device and that is sent in S22 includes the information about the processing capability 2 supported by the terminal device is used.

The terminal device may actively send the capability information of the terminal device to the network device. For example, in a process in which the terminal device initially accesses the network device, or after the terminal device successfully accesses the network device, the terminal device may actively send the capability information of the terminal device to the network device, or the terminal device may periodically send the capability information of the terminal device to the network device, or the terminal device does not need to actively send the capability information, and the network device may send a request to the terminal device when the network device needs to obtain the capability information of the terminal device. For example, before S22, the network device may send a capability request message to the terminal device, and after receiving the capability request message from the network device, the terminal device sends the capability information of the terminal device to the network device. For example, an implementation form of the capability request message is a UE capability enquiry message. For example, the terminal device sends the capability information of the terminal device to the network device by using a UE capability message. For example, the UE capability message is implemented by using a UE capability information message, may be a message specially used to report the capability information of the terminal device, or may be another type of message, and may be used to carry the capability information. Certainly, an implementation of the message is merely an example. Specific implementations of messages are not limited in this embodiment of this application. Herein, two concepts: "capability message" and "capability information", need to be distinguished. The capability information is used to indicate a capability of the terminal device. The capability message includes the capability information, or the capability message is used to carry the capability information, and the capability information is sent to the network device through the capability message.

In this embodiment of this application, the information about the processing capability 2 supported by the terminal device may include: a maximum number of frequency bands that can be configured for the terminal device in terms of the processing capability 2, and/or a maximum number of frequency bands that can be activated for the terminal device in terms of the processing capability 2. The maximum number of frequency bands that can be configured for the terminal device in terms of the processing capability 2 is represented as M in this specification. M may also be understood as a maximum number of frequency bands for which the processing capability 2 can be configured for the terminal device. Similarly, the maximum number of frequency bands that can be activated for the terminal device in terms of the processing capability 2 is represented as K in this specification. K may also be understood as a maximum number of frequency bands for which the processing capability 2 can be activated for the terminal device. In addition, activating the processing capability 2 may also be understood as dynamically scheduling the processing capability 2.

For example, the maximum number of frequency bands for which the processing capability 2 can be activated for the terminal device may also be understood as a maximum number of frequency bands for which the processing capability 2 can be dynamically scheduled for the terminal. M and K are both integers greater than or equal to 0. In this embodiment of this application, two pieces of information, namely, the maximum number of frequency bands that can be configured and the maximum number of frequency bands that can be activated, may be provided, so that greater flexibility can be provided for implementation of the terminal device, and more information can be provided for scheduling performed by the network device, thereby reducing resource waste of the terminal device as much as possible.

Further, M and K may be a same value or different values, or may be represented in another form, for example, a rule value agreed on by the terminal device and the network device. For example, in an implementation, a rule agreed on by the terminal device and the network device is that, provided that the terminal device supports the processing capability 2, the terminal device supports the processing capability 2 when only one frequency band is activated. In other words, both the maximum number of frequency bands that can be configured for the terminal device and the maximum number of frequency bands that can be activated for the terminal device are 1. For example, the terminal device supports aggregation of four carriers, and the terminal device and the network device agree on that the processing capability 2 can be configured and/or activated for only one carrier for the terminal device. Alternatively, in another implementation, a rule agreed on by the terminal device and the network device is that, provided that the terminal device supports the processing capability 2, the terminal device supports the processing capability 2 when all frequency bands are activated. For example, the terminal device supports aggregation of four carriers, and in this case, the rule agreed on by the terminal device and the network device is that the maximum number of frequency bands that can be configured for the terminal device is 4, and the maximum number of frequency bands that can be activated for the terminal device is 4. Alternatively, in another implementation, a rule agreed on by the terminal device and the network device is that the terminal device supports the processing capability 2 during single-carrier scheduling, and the terminal device supports the processing capability 1 during carrier aggregation scheduling or multicarrier scheduling.

Such an agreed rule may also be related to a frequency band of the terminal device. For example, in an implementation, a rule agreed on by the terminal device and the network device is that, in a frequency range 1 (FR 1), provided that the terminal device supports the processing capability 2, the terminal device supports the processing capability 2 when only one frequency band is activated. In other words, both the maximum number of frequency bands that can be configured for the terminal device and the maximum number of frequency bands that can be activated for the terminal device are 1. In an FR 2, the terminal device supports the processing capability 2. Alternatively, in another implementation, a rule agreed on by the terminal device and the network device is that, provided that the terminal device supports the processing capability 2, the terminal device supports the processing capability 2 when all frequency bands in an FR 1 are activated, and the terminal device supports the processing capability 1 when all frequency bands in an FR 2 are activated. For example, the terminal device supports aggregation of two carriers in the FR 1 and supports aggregation of two carriers in the FR 2, and in this case, the rule agreed on by the terminal device and the network device is that the maximum number of frequency bands that can be configured for the terminal device and that are in the FR 1 is 2, and the maximum number of frequency bands that can be activated for the terminal device and that are in the FR 1 is 2.

A difference between an activated frequency band and a configured frequency band may be understood as follows: The activated frequency band is a frequency band that is currently used by the terminal device to listen to a downlink control channel, and/or the activated frequency band is a frequency band that is currently used by the terminal device to receive and/or send a signal, or the activated frequency band may also be understood as a frequency band that can be dynamically scheduled. The configured frequency band is configured for the terminal device through higher layer signaling, and the terminal device needs to be indicated, through signaling, to perform an activation operation before listening to a downlink control channel and/or receiving and sending a signal in the frequency band, or the configured frequency band may also be understood as a frequency band that is configured for the terminal device through higher layer signaling and that can be dynamically scheduled only after the terminal device is indicated, through signaling, to perform an activation operation.

If the frequency band is a carrier, the information about the processing capability 2 supported by the terminal device may include a maximum number of carriers for which the processing capability 2 can be configured for the terminal device, and/or a maximum number of carriers for which the processing capability 2 can be activated for the terminal device. If the frequency band is a BWP, the information about the processing capability 2 supported by the terminal device may include a maximum number of BWPs for which the processing capability 2 can be configured for the terminal device, and/or a maximum number of BWPs for which the processing capability 2 can be activated for the terminal device.

Further, the information about the processing capability 2 supported by the terminal device may be that the terminal device has a same capability or different capabilities in different frequency bands or frequency band combinations. For example, a processing capability of the terminal device in the frequency band range 1 may be the same as or different from a processing capability of the terminal device in the frequency band range 2.

Further, the processing capability 2 may correspond to a processing time of a data channel. The data channel herein is, for example, an uplink data channel or a downlink data channel. Correspondingly, the processing time of the data channel is, for example, a processing time of the uplink data channel or a processing time of the downlink data channel. Then, for the processing capability 2, the processing time of the downlink data channel may correspond to corresponding M and K, and the processing time of the uplink data channel may also correspond to corresponding M and K. It can be learned from the foregoing description that the processing time of the downlink data channel may be obtained based on $N_1$, and the processing time of the uplink data channel may be obtained based on $N_2$. Therefore, it may be considered that $N_1$ may correspond to corresponding M and K, and $N_2$ may also correspond to corresponding M and K. For example, for $N_1$, M=1, and K=1; for $N_2$, M=2, and K=1. In this case, M and K that correspond to the processing time of the downlink data channel and M and K that correspond to the processing time of the uplink data channel, or M and K that correspond to $N_1$ and M and K that correspond to $N_2$ may be sent by the terminal device to the network device together, for example, carried in one message and sent to the network device, or may be separately sent by the terminal device to the network device, for example, carried in different messages and sent to the network device. In addition, if M and K are carried in different messages and sent to the network device, the messages may be sent together, or may be sent at different time. In addition, the processing time of the uplink data channel or the processing time of the downlink data channel corresponds to different subcarrier spacings or different DMRS configurations, and may correspond to different M and K. In this case, similarly, the terminal device may send M and K together or separately. For example, the processing time of the uplink data channel corresponds to different subcarriers, and may correspond to different M and K. In this case, M and K corresponding to different subcarriers may be sent by the terminal device to the network device together, for example, carried in one message and sent to the network device, or may be separately sent by the terminal device to the network device, for example, carried in different messages and sent to the network device. In addition, if M and K are carried in different messages and sent to the network device, the messages may be sent together, or may be sent at different time. This is not specifically limited.

As described above, the processing time $T_{proc,1}$ of the downlink data channel may be obtained based on $N_1$, and the processing time $T_{proc,2}$ of the uplink data channel may be obtained based on $N_2$. This may be used as an optional implementation. If a case in which there are two or more frequency bands is considered, the channel processing time may increase. If the processing time of the downlink data channel is obtained only based on $N_1$ shown in Table 1 and Table 2, the obtained processing time of the downlink data channel may be less than an actual requirement. Similarly, if the processing time of the uplink data channel is obtained only based on $N_2$ shown in Table 3 and Table 4, the obtained processing time of the uplink data channel may be less than an actual requirement. Therefore, corresponding processing may be performed on the basis of original $N_1$ and/or $N_2$. In view of this, this embodiment of this application further provides another implementation. The processing time of the downlink data channel may be obtained based on $N_1$ and a, and a is a preconfigured or predefined parameter. For example, the processing time of the downlink data channel may be preconfigured in the terminal device and the network device, or may be determined by the network device and the terminal device through negotiation, or is predefined in a protocol, where a is greater than 0. Similarly, the processing time of the uplink data channel may be obtained based on $N_2$ and b, where b is a preconfigured or predefined parameter. For example, the processing time of the uplink data channel may be preconfigured in the terminal device and the network device, or may be determined by the network device and the terminal device through negotiation, or is predefined in a protocol, where b is greater than 0.

Using a as an example, a may be a fixed value, for example, a fixed value that is preconfigured in the terminal device and the network device, or determined by the network device and the terminal device through negotiation, or predefined in a protocol. Alternatively, a may correspond to a subcarrier spacing or may be obtained based on a subcarrier spacing, or a may correspond to a number of frequency bands or may be obtained based on a number of frequency bands. Similarly, for b, b may be a fixed value, for example, a fixed value that is preconfigured in the terminal device and the network device, or determined by the network device and the terminal device through negotiation, or predefined in a protocol. Alternatively, b may correspond to a subcarrier spacing or may be obtained based on a subcarrier spacing, or b may also correspond to a number of frequency bands or may be obtained based on a number of frequency bands. A manner of obtaining a and a manner of obtaining b may be a same manner. For example, both a and b are obtained based on a subcarrier spacing. Alternatively, a manner of obtaining a and a manner of obtaining b may be different manners. For example, a is a fixed value, and b is obtained based on a number of frequency bands. a and b may be equal or may not be equal. This is not specifically limited.

For example, an implementation of obtaining the processing time of the downlink data channel based on $N_1$ and a is as follows:

$$T_{proc,1}=((N_1+d_{1,1}+d_{1,2}+a)(2048+144)\cdot \kappa 2^{-\mu})\cdot T_c \quad \text{(Formula 1)}$$

Similarly, an implementation of obtaining the processing time of the uplink data channel based on $N_2$ and b is as follows:

$$T_{proc,2}=\max(((N_2+d_{2,1}+d_{2,2}+b)(2048+144)\cdot \kappa 2^{-\mu})\cdot T_c, d_{2,3}) \quad \text{(Formula 2)}$$

$T_{proc,1}$ represents the processing time of the downlink data channel, and $T_{proc,2}$ represents the processing time of the uplink data channel. For descriptions of corresponding parameters in the formula 1 and the formula 2, refer to the foregoing descriptions. Details are not described again. Certainly, the formula 1 is merely an example, provided that the processing time of the downlink data channel can be obtained based on $N_1$ and a. A specific manner of obtaining the processing time of the downlink data channel based on $N_1$ and a is not limited in this embodiment of this application. Similarly, the formula 2 is merely an example. A specific manner of obtaining the processing time of the uplink data channel based on $N_2$ and b is not limited in this embodiment of this application.

Using the formula 1 as an example, clearly, the processing time of the downlink data channel that is obtained through calculation according to the formula 1 is greater than the processing time of the downlink data channel that is obtained based on $N_1$. In this case, a may also be understood as an additional processing time introduced for processing two or more frequency bands. Similarly, for b, b may be understood as an additional processing time introduced for processing two or more frequency bands.

The solution for redefining the processing time of the downlink data channel and the processing time of the uplink data channel described herein may be used in combination with another solution described in this specification, for example, may be used in combination with the solution in which the terminal device sends the capability information of the terminal device to the network device, or a solution that is to be described below and in which the network device determines first processing capability configuration information of at least one frequency band based on the capability information of the terminal device, or a solution that redefines the processing time of the downlink data channel and the processing time of the uplink data channel, or may not be used in combination with another solution described in this specification but may be independently used.

In this embodiment of this application, the network device may receive the capability information of the terminal device. In other words, the terminal device may report the capability information of the terminal device to the network device, so that the network device can determine the first processing capability configuration information of the at least one frequency band based on the capability information of the terminal device. In other words, the network device can perform scheduling based on the capability information of the terminal device, so that a scheduling result adapts to the capability information of the terminal device, thereby ensuring, as much as possible, that the terminal device can normally work within a capability range. In addition, in this embodiment of this application, the capability information of the terminal device includes the information about the processing capability 2 supported by the terminal device. In other words, the terminal device may report the information about the processing capability 2 supported by the terminal device, so that the network device can determine that the terminal device can support the processing capability 2. In this way, the network device can schedule the terminal device to work with the higher processing capability 2, thereby improving a processing capability of the terminal device, and enabling a resource of the terminal device to be relatively fully used. If the terminal device does not support the processing capability 2, the terminal device does not send the information about the processing capability 2 to the network device. If the network device does not receive the information that is about the processing capability 2 and that is sent by the terminal device, the network device may determine that the terminal device does not support the processing capability 2, and therefore does not schedule the terminal device to work with the processing capability 2. In this way, scheduling for the terminal device can be prevented from exceeding an actual capability of the terminal device, and it is ensured as much as possible that the terminal device can normally work.

In this embodiment of this application, the capability information of the terminal device includes information about the processing capability 2 supported by the terminal device during carrier aggregation. In other words, the terminal device may report the information about the processing capability 2 supported by the terminal device during carrier aggregation, so that the network device can determine a number of carriers that can support the processing capability 2 for the terminal device. In this way, the network device can properly schedule the carriers of the terminal device under the higher processing capability 2, thereby improving a processing capability of the terminal device, and enabling a resource of the terminal device to be relatively fully used.

After receiving the capability information of the terminal device, the network device may use the capability information of the terminal device. For example, the network device may determine, based on the capability information of the terminal device, how to schedule the terminal device, or how to specifically use the capability information of the terminal device after receiving the capability information of the terminal device. This is not limited in this embodiment of this application. In other words, the terminal device is responsible for sending the capability information of the terminal device, and the network device is responsible for receiving the capability information from the terminal device. It may be considered that a procedure ends here. In this case, S21 and S22 may be considered as a first part, and the first part may be used in combination with another solution described in this specification. For example, the first part may be used in combination with a solution to be described subsequently, or a solution described in the first part may be independently used.

The following steps are continued to be described by using an example in which the network device further determines, by using the capability information of the terminal device, a configuration of a resource scheduled for the terminal device.

S23: The network device determines, based on the capability information of the terminal device, the first processing capability configuration information of the at least one frequency band used for the terminal device.

In this embodiment of this application, the configuration information of the at least one frequency band mainly includes the information about the processing capability 2 configured (and/or activated) for the at least one frequency band. Therefore, in this specification, configuration information of a frequency band may also be referred to as configuration information of the processing capability 2 of the frequency band, the first processing capability configuration information of the frequency band, or the like. For example, the configuration information of the at least one frequency band may also be referred to as the first processing capability configuration information of the at least one frequency band. The at least one frequency band may belong to P frequency bands corresponding to the capability information sent by the terminal device, and may be understood that the at least one frequency band is a subset of the P frequency bands.

As described above, step S21 and step S22 may be used in combination with a subsequent solution, or may be independently used. In this case, the capability information of the terminal device based on which the network device determines the first processing capability configuration information in S23 may be sent by the terminal device to the network device in S22. In this case, S21 and S22 are used in communication with S23. Alternatively, the capability information of the terminal device based on which the network device determines the first processing capability configuration information in S23 may be obtained in another manner, for example, may be preconfigured in the network device. In this case, S21 and S22 do not need to be used in combination with S23. It can be learned from the above that S23 may be considered as a second part, and the second part may be used in combination with another solution described in this specification. For example, the second part may be used in combination with the foregoing first part or used in combination with the solution to be described subsequently, or the solution described in the second part may be independently used.

If the capability information of the terminal device indicates that the terminal device supports the processing capability 2, and further, the capability information of the terminal device indicates processing capability information of the P frequency bands supported by the terminal device, the network device may configure the processing capability 2 for one or more frequency bands in the at least one frequency band. If the terminal device does not send the information about the processing capability 2 of the terminal device to the network device, it indicates that the terminal device does not support the processing capability 2. Alternatively, if the capability information that is of the terminal device and that is obtained by the network device in another manner indicates that the terminal device does not support the processing capability 2, the network device may configure the processing capability 1 for all frequency bands in the at least one frequency band, and does not configure the processing capability 2, so that scheduling for the terminal device adapts to an actual capability of the terminal device. In the following description, an example in which the terminal device supports the processing capability 2 is mainly used. For another example, if the capability information of the terminal device indicates that the terminal device supports the processing capability 2: if the terminal device is in a single-carrier scenario, the network device may configure the processing capability 1 for one frequency band; or if the terminal device is in a multi-carrier scenario, the network device may configure the processing capability 2 for one or more frequency bands in at least two frequency bands. In this way, the processing capability of the terminal device can be effectively improved.

The at least one frequency band used for the terminal device means that the at least one frequency band is configured for the terminal device, and the configuration information of the frequency band may include a processing capability that is of the terminal device and that need to be scheduled when the terminal device works in the frequency band.

As described above, the frequency band is, for example, a carrier or a BWP. Alternatively, the frequency band may be a transport block, a data stream, an antenna layer, or the like. This is not specifically limited.

If the frequency band is a carrier, a BWP, or the like, it may also be understood that this embodiment of this application is used in a carrier aggregation (CA) scenario, or used in an MR-DC scenario. Currently, it is considered that the terminal device can support the processing capability 2 only in a case of a single carrier. In a case of CA or MR-DC, whether the terminal device can support the processing capability 2 is not determined because more resources need to be processed. Therefore, in the CA or MR-DC scenario, a carrier that is scheduled by using the processing capability 1 and a carrier that is scheduled by using the processing capability 2 are not currently determined.

This causes a problem: If the terminal device does not determine the carrier that needs to be scheduled by using the processing capability 1 and the carrier that needs to be scheduled by using the processing capability 2, for any carrier, the terminal device may first use the processing capability 2 to schedule the carrier. In this case, to implement the processing capability 2, the terminal device may activate all central processing unit (CPU) resources. Consequently, implementation complexity of the terminal device is increased, and power consumption is increased.

Figure 3:
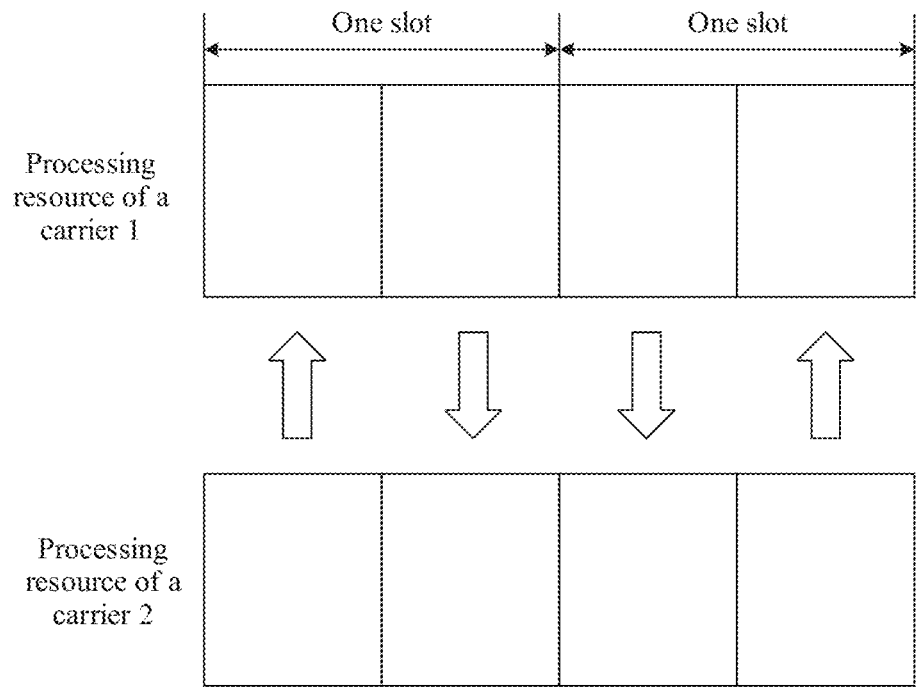
FIG. 3 is a schematic diagram in which a terminal device schedules processing resources for a plurality of carriers.

In addition, if there is no limitation, complexity of scheduling a processing resource by the terminal device is increased. For example, in a slot 1, the terminal device schedules a carrier 1 by using the processing capability 1, and schedules a carrier 2 by using the processing capability 2. In this case, in the slot 1, a processing resource of the carrier 1 may be first used to process data of the carrier 2, and after the data of the carrier 2 is completely processed, a processing resource of the carrier 2 is then used to process data of the carrier 1. In a slot 2, the terminal device schedules the carrier 1 by using the processing capability 2, and schedules the carrier 2 by using the processing capability 1. In this case, in the slot 2, the processing resource of the carrier 2 may be first used to process the data of the carrier 1, and after the data of the carrier 1 is completely processed, the processing resource of the carrier 1 is then used to process the data of the carrier 2. For this process, refer to FIG. 3. It can be learned that such a processing process causes frequent scheduling and control of processing resources. Consequently, implementation of the terminal device is complex, and power saving of the terminal device is not facilitated.

However, in this embodiment of this application, the terminal device may report the capability information of the terminal device to the network device, so that the network device can determine the first processing capability configuration information of the at least one frequency band based on the capability information of the terminal device. Therefore, even in a scenario in which two or more frequency bands are configured for the terminal device, such as the CA scenario or the MR-DC scenario, the network device can also be clear of how to schedule the terminal device in each frequency band. In this way, the network device can implement relatively orderly and proper scheduling during scheduling. This helps reduce frequent scheduling and control of processing resources of the terminal device, reduces implementation complexity of the terminal device, and also helps the terminal device implement power saving.

In an implementation, the first processing capability configuration information of the at least one frequency band includes: a number of frequency bands for which the processing capability 2 is configured for the terminal device and/or a number of frequency bands for which the processing capability 2 is activated for the terminal device. To be specific, the first processing capability configuration information of the at least one frequency band may include the number of frequency bands for which the processing capability 2 is configured for the terminal device, or the number of frequency bands for which the processing capability 2 is activated for the terminal device, or the number of frequency bands for which the processing capability 2 is configured for the terminal device and the number of frequency bands for which the processing capability 2 is activated for the terminal device. Certainly, the first processing capability configuration information of the at least one frequency band may further include other information. This is not specifically limited. According to the technical solution in this embodiment of this application, a frequency band such as a carrier or a BWP for which the processing capability 2 can be configured (or activated) can be relatively fixed, so that complexity caused by frequent resource adjustment of the terminal device is avoided as much as possible, and resource waste caused by reservation of excessive processing resources by the terminal device is avoided.

In another implementation, the first processing capability configuration information of the at least one frequency band includes: configuring the processing capability 2 for the at least one frequency band, and/or activating the processing capability 2 for the at least one frequency band. In other words, the first processing capability configuration information of the at least one frequency band may include information about configuring the processing capability 2 for the at least one frequency band, or information about activating the processing capability 2 for the at least one frequency band, or information about configuring the processing capability 2 for the at least one frequency band and information about activating the processing capability 2 for the at least one frequency band. Configuring the processing capability 2 for the at least one frequency band may be understood as configuring the processing capability 2 for all or some of the at least one frequency band. Similarly, activating the processing capability 2 for the at least one frequency band may be understood as activating the processing capability 2 for all or some of the at least one frequency band. In this implementation, the network device does not configure the number, but directly indicates specific frequency bands for which the processing capability 2 is configured and/or specific frequency bands for which the processing capability 2 is activated. Therefore, the terminal device does not need to select, based on the number, specific frequency bands for which the processing capability 2 is configured and/or specific frequency bands for which the processing capability 2 is activated, thereby reducing workload of the terminal device, and enabling a consistent understanding between the terminal device and the network device.

Because the network device has obtained the capability information of the terminal device, when determining the configuration information of the at least one frequency band, the network device may determine the configuration information of the at least one frequency band based on the capability information of the terminal device, so that scheduling for the terminal device can adapt to a capability of the terminal device, and the capability of the terminal device can be fully used. Therefore, regardless of which one of the foregoing implementations of the first processing capability configuration information of the at least one frequency band is used, the number of frequency bands for which the processing capability 2 is configured for the terminal device may be less than or equal to the maximum number of frequency bands for which the processing capability 2 can be configured for the terminal device, and/or the number of frequency bands for which the processing capability 2 is activated for the terminal device may be less than or equal to the maximum number of frequency bands for which the processing capability 2 can be activated for the terminal device. To be specific, the number of frequency bands for which the processing capability 2 is configured for the terminal device may be less than or equal to the maximum number of frequency bands for which the processing capability 2 can be configured for the terminal device, or the number of frequency bands for which the processing capability 2 is activated for the terminal device is less than or equal to the maximum number of frequency bands for which the processing capability 2 can be activated for the terminal device; or the number of frequency bands for which the processing capability 2 is configured for the terminal device may be less than or equal to the maximum number of frequency bands for which the processing capability 2 can be configured for the terminal device, and the number of frequency bands for which the processing capability 2 is activated for the terminal device is less than or equal to the maximum number of frequency bands for which the processing capability 2 can be activated for the terminal device. Certainly, the number of frequency bands configured for the terminal device, the number of frequency bands activated for the terminal device, the maximum number of frequency bands that can be configured for the terminal device, and the maximum number of frequency bands that can be activated for the terminal device that are described herein are all for the processing capability 2, namely, the first processing capability.

As mentioned above, the processing time of the downlink data channel may correspond to corresponding M and K, and the processing time of the uplink data channel may also correspond to corresponding M and K. In this case, when performing downlink scheduling, the network device may perform scheduling based on M and K corresponding to the processing time of the downlink data channel. Alternatively, it may be understood that if the at least one frequency band is a downlink frequency band, both the maximum number of frequency bands for which the processing capability 2 can be configured for the terminal device and the maximum number of frequency bands for which the processing capability 2 can be activated for the terminal device correspond to the processing time of the downlink data channel. If the at least one frequency band is an uplink frequency band, both the maximum number of frequency bands for which the processing capability 2 can be configured for the terminal device and the maximum number of frequency bands for which the processing capability 2 can be activated for the terminal device correspond to the processing time of the uplink data channel.

As described above, values and signaling obtaining manners of M and K herein are not limited. For example, M and K may be reported by using signaling, or may be determined by using an agreed rule.

S24: The network device sends indication information to the terminal device, and the terminal device receives the indication information from the network device, where the indication information is used to indicate the first processing capability configuration information of the at least one frequency band.

The first processing capability configuration information of the at least one frequency band has been described in S23. After determining the first processing capability configuration information of the at least one frequency band, the network device may notify the terminal device of the first processing capability configuration information of the at least one frequency band by using an indication message, so that the terminal device can work based on scheduling performed by the network device.

In an example, the network device may send the indication information to the terminal device by using higher layer signaling. The higher layer signaling is, for example, radio resource control (RRC) signaling or other higher layer signaling. Alternatively, the network device may send the indication information to the terminal device by using other signaling. This is not specifically limited.

S25: The terminal device allocates a processing resource to the at least one frequency band based on the indication information.

The frequency band in this specification is a frequency domain resource, for example, a carrier or a BWP, configured by the network device for the terminal device. The processing resource is a resource that is used to perform some processing operations and that is in the terminal device, and may be understood as an internal resource of the terminal device, for example, a CPU resource.

For example, the terminal device may determine the first processing capability configuration information of the at least one frequency band based on the indication information, so that the terminal device can determine, based on the first processing capability configuration information of the at least one frequency band, a number of processing resource cores separately configured for the at least one frequency band, and for one frequency band in the at least one frequency band, may further determine processing processes that are separately performed by a processing resource core configured for the frequency band. The processing resource core herein is, for example, a CPU or an IP core. For example, the at least one frequency band is a carrier 1 and a carrier 2, and the terminal device determines, based on configuration information of the carrier 1 and configuration information of the carrier 2, to configure the processing capability 2 for the carrier 1 and configure the processing capability 2 for the carrier 2. In this case, the terminal device may configure two processing resource cores, namely, a processing resource core 1 and a processing resource core 2, for the carrier 1, and configure one processing resource core, namely, a processing resource core 3, for the carrier 2. In addition, the terminal device may further configure the processing resource core 1 to perform operations such as modulation and coding on the carrier 1, and configure the processing resource core 2 to perform operations such as demodulation and decoding on the carrier 2. The processing resource core 3 is used to perform all processing processes, other than demodulation and decoding, on the carrier 1 and the carrier 2.

S23 to S25 are all optional steps and are not mandatory.

It can be learned that the terminal device can clearly determine, according to an indication of the network device, how to allocate a processing resource to the at least one frequency band. This helps reduce frequent scheduling and control of processing resources of the terminal device, reduces implementation complexity of the terminal device, and also helps the terminal device implement power saving.

The following describes, with reference to the accompanying drawings, apparatuses according to the embodiments of this application.

Figure 4:
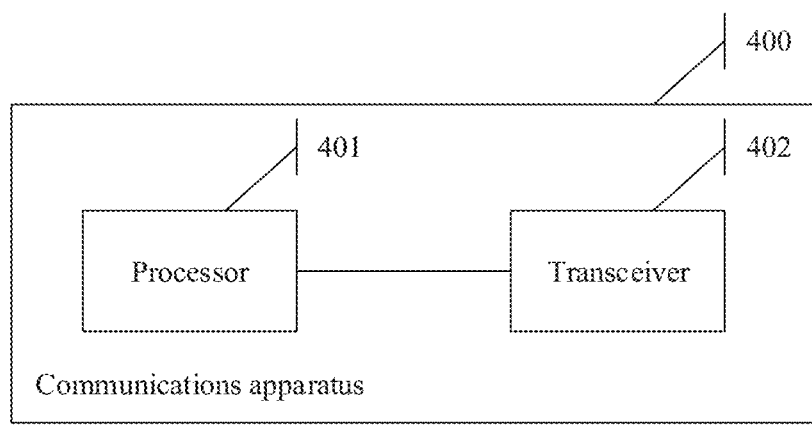
FIG. 4 is a schematic structural diagram of a communications apparatus according to an embodiment of this application.

FIG. 4 is a schematic structural diagram of a communications apparatus 400. The communications apparatus 400 may implement the functions of the terminal device described above. The communications apparatus 400 may be the network device described above, or may be a chip disposed in the network device described above. The communications apparatus 400 may include a processor 401 and a transceiver 402. The processor 401 may be configured to perform S23 in the embodiment shown in FIG. 2, and/or support another process of the technology described in this specification. The transceiver 402 may be configured to perform S22 and S24 in the embodiment shown in FIG. 2, and/or support another process of the technology described in this specification.

For example, the transceiver 402 is configured to receive capability information from a terminal device, where the capability information of the terminal device includes information about a first processing capability supported by the terminal device.

The processor 401 is configured to determine, based on the capability information of the terminal device, first processing capability configuration information of at least one frequency band used for the terminal device.

All related content of the steps in the foregoing method embodiments may be cited in function descriptions of corresponding function modules. Details are not described herein again.

Figure 5:
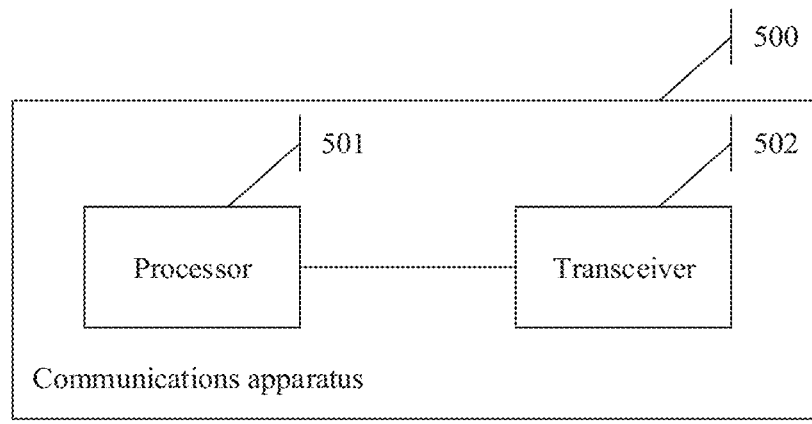
FIG. 5 is a schematic structural diagram of a communications apparatus according to an embodiment of this application.

FIG. 5 is a schematic structural diagram of a communications apparatus 500. The communications apparatus 500 may implement the functions of the terminal device described above. The communications apparatus 500 may be the terminal device described above, or may be a chip disposed in the terminal device described above. The communications apparatus 500 may include a processor 501 and a transceiver 502. The processor 501 may be configured to perform S21 and S25 in the embodiment shown in FIG. 2, and/or support another process of the technology described in this specification. The transceiver 502 may be configured to perform S22 and S24 in the embodiment shown in FIG. 2, and/or support another process of the technology described in this specification.

For example, the processor 501 is configured to determine capability information of a terminal device, where the capability information of the terminal device includes information about a first processing capability supported by the terminal device.

The transceiver 502 is configured to send the capability information of the terminal device to a network device.

All related content of the steps in the foregoing method embodiments may be cited in function descriptions of corresponding function modules. Details are not described herein again.

Figure 6A:
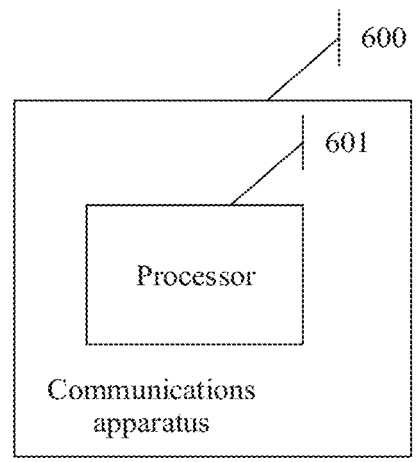
FIG. 6A and FIG. 6B are two schematic structural diagrams of a communications apparatus according to an embodiment of this application.

In a simple embodiment, a person skilled in the art can conceive that the communications apparatus 400 or the communications apparatus 500 may alternatively be implemented in a structure of a communications apparatus 600 shown in FIG. 6A. The communications apparatus 600 may implement the functions of the terminal device or the network device described above. The communications apparatus 600 may include a processor 601.

When the communications apparatus 600 is configured to implement the functions of the terminal device described above, the processor 601 may be configured to perform S21 and S25 in the embodiment shown in FIG. 2, and/or support another process of the technology described in this specification. Alternatively, when the communications apparatus 600 is configured to implement the functions of the network device described above, the processor 601 may be configured to perform S23 in the embodiment shown in FIG. 2, and/or support another process of the technology described in this specification.

The communications apparatus 600 may be implemented by a field-programmable gate array (FPGA), an application-specific integrated circuit (ASIC), a system on chip (SoC), a central processing unit (CPU), a network processor (NP), a digital signal processing circuit (DSP), a micro controller unit (MCU), a programmable controller (PLD), or another integrated chip. The communications apparatus 600 may be disposed in the terminal device or network device in the embodiments of this application, so that the terminal device or the network device implements the method according to the embodiments of this application.

In an optional implementation, the communications apparatus 600 may include a transceiver component, configured to communicate with another device. When the communications apparatus 600 is configured to implement the functions of the terminal device or the network device described above, the transceiver component may be configured to perform S22 in the embodiment shown in FIG. 2, and/or support another process of the technology described in this specification.

Figure 6B:
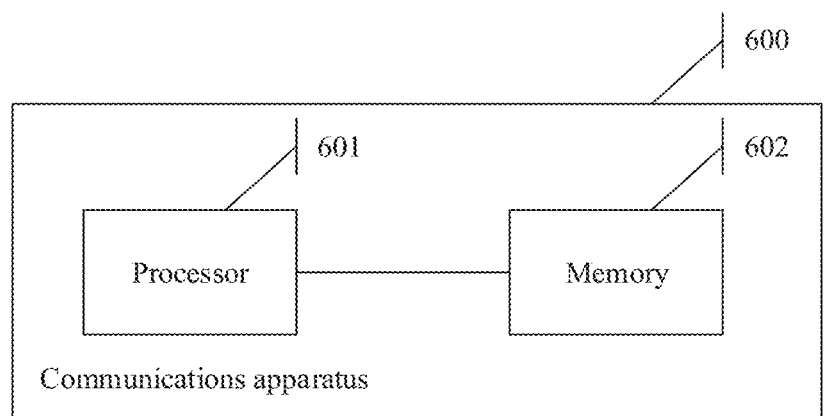

In an optional implementation, referring to FIG. 6B, the communications apparatus 600 may further include a memory 602. The memory 602 is configured to store a computer program or an instruction, and the processor 601 is configured to decode and execute the computer program or the instruction. It should be understood that the computer program or the instruction may include a function program of the terminal device or the network device. When the function program of the terminal device is decoded and executed by the processor 6oi, the terminal device may be enabled to implement the functions of the terminal device in the method in the embodiment shown in FIG. 2 in the embodiments of this application. When the function program of the network device is decoded and executed by the processor 6oi, the network device may be enabled to implement the functions of the network device in the method in the embodiment shown in FIG. 2 in the embodiments of this application.

In another optional implementation, the function program of the terminal device or the network device is stored in an external memory of the communications apparatus 600. When the function program of the terminal device is decoded and executed by the processor 601, the memory 602 temporarily stores a part or all of content of the function program of the terminal device. When the function program of the network device is decoded and executed by the processor 6oi, the memory 602 temporarily stores a part or all of content of the function program of the network device.

In another optional implementation, the function program of the terminal device or the network device is disposed in the internal memory 602 of the communications apparatus 600. When the internal memory 602 of the communications apparatus 600 stores the function program of the terminal device, the communications apparatus 600 may be disposed in the terminal device in the embodiments of this application. When the internal memory 602 of the communications apparatus 600 stores the function program of the network device, the communications apparatus 600 may be disposed in the network device in the embodiments of this application.

In yet another optional implementation, a part of content of the function program of the terminal device is stored in an external memory of the communications apparatus 600, and remaining content of the function program of the terminal device is stored in the internal memory 602 of the communications apparatus 600. Alternatively, a part of content of the function program of the network device is stored in an external memory of the communications apparatus 600, and remaining content of the function program of the network device is stored in the internal memory 602 of the communications apparatus 600.

In the embodiments of this application, the communications apparatus 400, the communications apparatus 500, and the communications apparatus 600 are presented in a form in which each function module is obtained through division based on each function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 400 provided in the embodiment shown in FIG. 4 may alternatively be implemented in another form. For example, the communications apparatus includes a processing module and a transceiver module. For example, the processing module may be implemented by the processor 401, and the transceiver module may be implemented by the transceiver 402. The processing module may be configured to perform S23 in the embodiment shown in FIG. 2, and/or support another process of the technology described in this specification. The transceiver module may be configured to perform S22 and S24 in the embodiment shown in FIG. 2, and/or support another process of the technology described in this specification.

For example, the transceiver module is configured to receive capability information from a terminal device, where the capability information of the terminal device includes information about a first processing capability supported by the terminal device.

The processing module is configured to determine, based on the capability information of the terminal device, first processing capability configuration information of at least one frequency band used for the terminal device.

All related content of the steps in the foregoing method embodiments may be cited in function descriptions of corresponding function modules. Details are not described herein again.

Similarly, the communications apparatus 500 provided in the embodiment shown in FIG. 5 may alternatively be implemented in another form. For example, the communications apparatus includes a processing module and a transceiver module. For example, the processing module may be implemented by the processor 501, and the transceiver module may be implemented by the transceiver 502. The processing module may be configured to perform S21 and S25 in the embodiment shown in FIG. 2, and/or support another process of the technology described in this specification. The transceiver module may be configured to perform S22 and S24 in the embodiment shown in FIG. 2, and/or support another process of the technology described in this specification.

For example, the processing module is configured to determine capability information of a terminal device, where the capability information of the terminal device includes information about a first processing capability supported by the terminal device.

The transceiver module is configured to send the capability information of the terminal device to a network device.

All related content of the steps in the foregoing method embodiments may be cited in function descriptions of corresponding function modules. Details are not described herein again.

The communications apparatus 400, the communications apparatus 500, and the communications apparatus 600 provided in the embodiments of this application may be configured to perform the method provided in the embodiment shown in FIG. 2. Therefore, for technical effects that can be achieved by the communications apparatus 400, the communications apparatus 500, and the communications apparatus 600, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments of this application without departing from the spirit and scope of this application. This application is intended to cover these modifications and variations of the embodiments of this application provided that they fall within the scope of claims of this application and their equivalent technologies.

What is claimed is:

1. A method comprising:
receiving capability information from a terminal device, wherein the capability information comprises information about a first processing capability supported by the terminal device, the information about the first processing capability supported by the terminal device comprising a first maximum number of carriers for which the first processing capability can be configured for the terminal device, and wherein the first processing capability corresponds to a first processing time of a data channel that is smaller than a second processing time of the data channel, the second processing time corresponding to a second processing capability supported by the terminal device predefined in a protocol;
configuring a first number of carriers for the first processing capability for the terminal device, the first number less than or equal to the first maximum number of carriers for which the first processing capability can be configured for the terminal device; and
sending indication information to the terminal device, wherein the indication information indicates first processing capability configuration information of at least one carrier for the terminal device.

2. The method according to claim 1, wherein the information about the first processing capability supported by the terminal device comprises:
a second maximum number of carriers for which the first processing capability can be activated for the terminal device; and
wherein the method further comprises:
activating the first processing capability for a second number of carriers for the terminal device, the second number less than or equal to the second maximum number of carriers for which the first processing capability can be activated for the terminal device.

3. The method according to claim 1, wherein the data channel is an uplink data channel or a downlink data channel.

4. The method according to claim 3, wherein a processing time of the downlink data channel is obtained based on a decoding time N1 of the downlink data channel and a, a is a preconfigured or predefined parameter, and a is greater than zero; and a processing time of the uplink data channel is obtained based on an uplink data preparation time N2 and b, b is a preconfigured or predefined parameter; and b is greater than 0.

5. A method comprising:

determining capability information of a terminal device, wherein the capability information comprises information about a first processing capability supported by the terminal device, wherein the first processing capability corresponds to a first processing time of a data channel that is smaller than a second processing time of the data channel, the second processing time corresponding to a second processing capability supported by the terminal device predefined in a protocol; and
sending the capability information to a network device; and
wherein the method further comprises: receiving indication information from the network device, wherein the indication information indicates first processing capability configuration information of at least one carrier, and wherein
a first number of carriers that is configured for the terminal device according to the first processing capability is less than or equal to a first maximum number of carriers for which the first processing capability can be configured for the terminal device; or
a second number of carriers that is activated for the terminal device according to the first processing capability is less than or equal to a second maximum number of carriers for which the first processing capability can be activated for the terminal device.

6. The method according to claim 5, wherein the information about the first processing capability supported by the terminal device comprises:
the first maximum number of carriers for which the first processing capability can be configured for the terminal device, or the second maximum number of carriers for which the first processing capability can be activated for the terminal device.

7. The method according to claim 5, wherein the data channel is an uplink data channel or a downlink data channel.

8. The method according to claim 7, wherein a processing time of the downlink data channel is obtained based on a decoding time N1 of the downlink data channel and a, a is a preconfigured or predefined parameter, and a is greater than zero; and a processing time of the uplink data channel is obtained based on an uplink data preparation time N2 and b, b is a preconfigured or predefined parameter; and b is greater than 0.

9. A communications apparatus, comprising:
one or more processors, and
a non-transitory storage medium configure to store program instructions;
wherein, when executed by the one or more processors, the program instructions cause the communications apparatus to perform:
receiving capability information from a terminal device, wherein the capability information comprises information about a first processing capability supported by the terminal device, and the information about the first processing capability supported by the terminal device comprises a first maximum number of carriers for which the first processing capability can be configured for the terminal device, and wherein the first processing capability corresponds to a first processing time of a data channel that is smaller than a second processing time of the data channel, the second processing time corresponding to a second processing capability supported by the terminal device predefined in a protocol;
configuring the first processing capability for a first number of carriers for the terminal device, the first number less than or equal to the first maximum number of carriers for which the first processing capability can be configured for the terminal device; and sending indication information to the terminal device, wherein the indication information indicates first processing capability configuration information of at least one carrier used for the terminal device.

10. The communications apparatus according to claim 9, wherein the information about the first processing capability supported by the terminal device comprises:

a second maximum number of carriers for which the first processing capability can be activated for the terminal device; and wherein the program instructions, when executed by the one or more processors, cause the communications apparatus further to perform:

activating the first processing capability for a second number of carriers for the terminal device, the second number less than or equal to the second maximum number of carriers for which the first processing capability can be activated for the terminal device.

11. The communications apparatus according to claim 9, wherein the data channel is an uplink data channel or a downlink data channel.

12. The communications apparatus according to claim 11, wherein a processing time of the downlink data channel is obtained based on a decoding time N1 of the downlink data channel and a, a is a preconfigured or predefined parameter, and a is greater than zero; and a processing time of the uplink data channel is obtained based on an uplink data preparation time N2 and b, b is a preconfigured or predefined parameter; and b is greater than 0.

13. A communications apparatus, comprising:
one or more processors, and
a non-transitory storage medium configure to store program instructions;
wherein, when executed by the one or more processors, the program instructions cause the communications apparatus to perform:
determining capability information of a terminal device, wherein the capability information comprises information about a first processing capability supported by the terminal device, wherein the first processing capability corresponds to a first processing time of a data channel that is smaller than a second processing time of the data channel, the second processing time corresponding to a second processing capability supported by the terminal device predefined in a protocol; and sending the capability information to a network device; and wherein the program instructions, when executed by the one or more processors, cause the communications apparatus further to perform:

receiving indication information from the network device, wherein the indication information indicates first processing capability configuration information of at least one carrier, and wherein a first number of carriers that is configured for the terminal device according to the first processing capability is less than or equal to a first maximum number of carriers for which the first processing capability can be configured for the terminal device; or a second number of carriers that is activated for the terminal device according to the first processing capability is less than or equal to a second maximum number of carriers for which the first processing capability can be activated for the terminal device.

14. The communications apparatus according to claim 13, wherein the information about the first processing capability supported by the terminal device comprises:

the first maximum number of carriers for which the first processing capability can be configured for the terminal device, or the second maximum number of carriers for which the first processing capability can be activated for the terminal device.

15. The communications apparatus according to claim 13, wherein the data channel is an uplink data channel or a downlink data channel.

16. The communications apparatus according to claim 15, wherein a processing time of the downlink data channel is obtained based on a decoding time N1 of the downlink data channel and a, a is a preconfigured or predefined parameter, and a is greater than zero; and a processing time of the uplink data channel is obtained based on an uplink data preparation time N2 and b, b is a preconfigured or predefined parameter; and b is greater than 0.

* * * * *

UNITED STATES PATENT AND TRADEMARK OFFICE
CERTIFICATE OF CORRECTION

PATENT NO. : 11,611,871 B2
APPLICATION NO. : 17/155410
DATED : March 14, 2023
INVENTOR(S) : Feng It is certified that error appears in the above-identified patent and that said Letters Patent is hereby corrected as shown below:

In the Specification

In the Detailed Description of Illustrative Embodiments, Column 10, Line 61; delete "UL" and insert --µUL--.

In the Detailed Description of Illustrative Embodiments, Column 11, Line 34; insert --µ-- between "uses" and "that".

In the Detailed Description of Illustrative Embodiments, Column 11, Line 35; delete "UL" and insert --µUL--.

In the Detailed Description of Illustrative Embodiments, Column 12, Line 23; insert --µ-- between "," and "that".

In the Detailed Description of Illustrative Embodiments, Column 12, Line 26; insert --µ-- after "final".

In the Detailed Description of Illustrative Embodiments, Column 12, Line 29; delete "UL" and insert --µUL--.

In the Detailed Description of Illustrative Embodiments, Column 12, Line 30; insert --µ-- between "," and "that".

In the Detailed Description of Illustrative Embodiments, Column 30, Lines 53 and 58; delete "6o*i*" and insert --601--.

In the Detailed Description of Illustrative Embodiments, Column 31, Line 3; delete "6o*i*" and insert --601--.

Signed and Sealed this
Eighteenth Day of April, 2023

Katherine Kelly Vidal
*Director of the United States Patent and Trademark Office*